(12) United States Patent
Campau

(10) Patent No.: US 10,008,751 B2
(45) Date of Patent: Jun. 26, 2018

(54) SYSTEM AND METHOD FOR POWERING A DEVICE USED IN CONJUNCTION WITH A WET CELL BATTERY

(71) Applicant: Flow-Rite Controls, Ltd., Byron Center, MI (US)

(72) Inventor: Daniel N. Campau, Ada, MI (US)

(73) Assignee: FLOW-RITE CONTROLS, LTD., Byron Center, MI (US)

(*) Notice: Subject to any disclaimer, the term of this patent is extended or adjusted under 35 U.S.C. 154(b) by 62 days.

(21) Appl. No.: 15/259,696

(22) Filed: Sep. 8, 2016

(65) Prior Publication Data

US 2017/0077563 A1 Mar. 16, 2017

Related U.S. Application Data

(60) Provisional application No. 62/216,642, filed on Sep. 10, 2015.

(51) Int. Cl.
*H01M 10/06* (2006.01)
*H01M 10/48* (2006.01)
*H01M 2/12* (2006.01)
*H01M 2/36* (2006.01)

(52) U.S. Cl.
CPC ........... *H01M 10/484* (2013.01); *H01M 2/12* (2013.01); *H01M 2/36* (2013.01); *H01M 10/482* (2013.01)

(58) Field of Classification Search
CPC .................................................... H01M 10/06
See application file for complete search history.

(56) References Cited

U.S. PATENT DOCUMENTS

| | | | |
|---|---|---|---|
| 4,388,584 A | 6/1983 | Dahl et al. | |
| 5,936,382 A | 8/1999 | Jones et al. | |
| 6,372,377 B1* | 4/2002 | Ovshinsky | H01M 2/1223 429/120 |
| 2004/0140005 A1 | 7/2004 | Campau | |
| 2010/0019773 A1 | 1/2010 | Son | |
| 2011/0059340 A1* | 3/2011 | Dougherty | H01G 9/038 429/57 |
| 2011/0106280 A1 | 5/2011 | Zeier | |
| 2011/0128154 A1 | 6/2011 | Herrema et al. | |
| 2012/0237829 A1* | 9/2012 | Fujiwara | H01M 4/14 429/227 |
| 2015/0200424 A1* | 7/2015 | Ogasawara | H01M 2/28 429/163 |

OTHER PUBLICATIONS

International Search Report and Written Opinion from PCT/US2016/050704 dated Nov. 15, 2016.

* cited by examiner

*Primary Examiner* — Jacob Marks
(74) *Attorney, Agent, or Firm* — Warner Norcross and Judd LLP

(57) ABSTRACT

The specification discloses a system and a method for powering electrical devices using the voltage difference between the cells of a wet cell battery. The system includes probes inserted into the electrolyte in different cells of the battery. The probes are electrically connected to the devices to power the devices. The probes, the devices, and/or the connecting wires may be incorporated into, or otherwise installed with, vent caps or single-point watering systems.

12 Claims, 1 Drawing Sheet

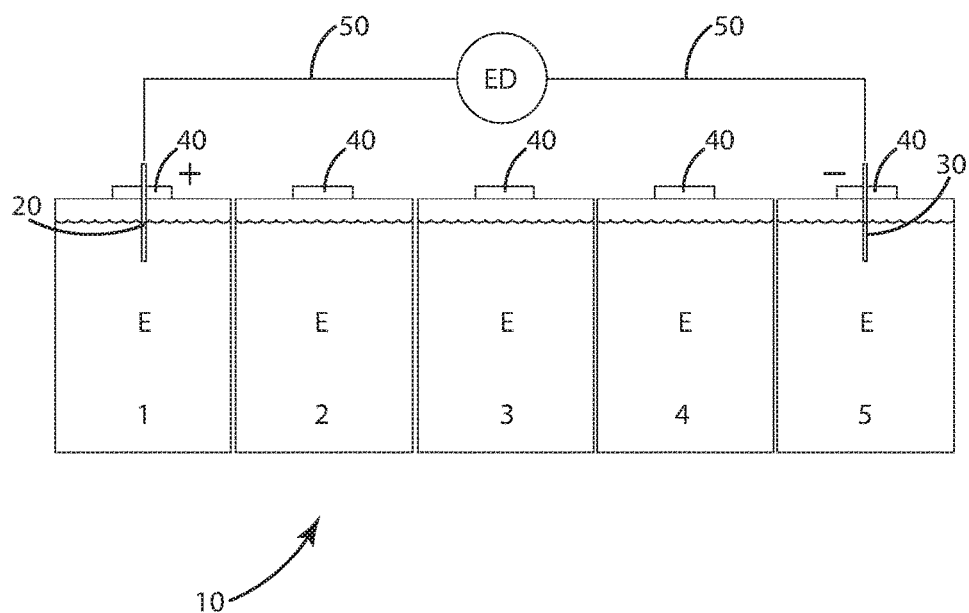

SYSTEM AND METHOD FOR POWERING A DEVICE USED IN CONJUNCTION WITH A WET CELL BATTERY

BACKGROUND

The present invention relates to wet cell batteries, and more particularly to systems and methods for powering devices used in conjunction with wet cell batteries.

Wet cell batteries, also known as flooded cell batteries and vented cell batteries, are well known and widely used to power a variety of industrial and commercial vehicles, equipment, and other products. Such batteries include multiple cells. A well-known type of wet cell battery is the lead-acid battery.

Electrical devices are often used in conjunction with such batteries to monitor the usage the batteries and to maintain the condition of the batteries. These devices may include sensors (e.g. for detecting electrolyte level, voltage, specific gravity, and temperature), watering valves, data transmitters, and battery management systems.

The electrical devices require electrical power, which is usually provided by tapping into the battery cabling and/or the battery inter-cell connector straps with wires that connect to the devices. Unfortunately, this approach often leaves the wires exposed to damage, which may pose a fire or explosion hazard. In addition, corrosion may be a problem at the wire connection points due to galvanic activity accelerated by the electrically active battery top, for example due to the acidic atmosphere.

Some existing devices, such as level sensors including LED (light emitting diode) indicator lights, are often powered using a different approach. A circuit is provided having as its positive electrode a probe in contact with the cell electrolyte. The circuit has as its negative electrode a wire connected to a battery post or an inter-cell connector strap. Unfortunately, the wires have the same problems as noted in the preceding paragraph.

SUMMARY OF THE INVENTION

The present invention provides an improved system and method for powering electrical devices in conjunction with wet cell batteries. The system and method includes electrically conductive, acid-resistant probes inserted into the electrolyte of different cells within the wet cell battery.

BRIEF DESCRIPTION OF THE DRAWING

FIG. 1 is a schematic diagram of a wet cell battery including the electrical device power circuit in accordance with an embodiment of the present invention.

DESCRIPTION OF THE CURRENT EMBODIMENTS

A wet cell battery of a type suitable for use with the present invention is schematically illustrated in the drawings and generally designated 10. Wet cell batteries also are known as flooded cell batteries and vented cell batteries. Such batteries are well known and widely used to power a variety of industrial and commercial vehicles, equipment, and other products. A well-known type of wet cell battery is the lead-acid battery.

A wet cell battery typically includes multiple cells. For example, the wet cell battery 10 of the current embodiment includes five cells designated 1, 2, 3, 4, and 5. Wet cell batteries may have a greater or lesser number of cells. Each cell contains electrolyte E. The multiple cells of the battery 10 are wired or otherwise connected in series so that each pair of adjacent cells has a nominal voltage potential between them. The voltage potential typically is 2 V (volts), but also may be greater or lesser. Accordingly, the numbers in this description are an example, and the present invention is equally applicable to wet cell batteries having different numbers of cells and/or different nominal voltages provided by the cells.

The present invention recognizes that a suitable source of electrical energy to power low-energy devices is available using the voltage difference between the cells 1, 2, 3, 4, and 5.

The system includes two conductive probes 20 and 30 inserted into the electrolyte E in two separate cells 1 and 5 spaced apart from one another. The probe 20 is the positive probe, and the probe 30 is the negative probe. The number of cells between the utilized cells (i.e. the cells into which the probes 20 and 30 are inserted) determine the voltage differential between the two probes. In the disclosed embodiment, the probes 20 and 30 are inserted into cells 1 and 5, but the probes may be inserted into any different cells. The probes 20 and 30 serve as the positive and negative power supply electrodes or connections for one or more electrical devices ED including instrumentation, control valves, and data transmitters. Examples of devices ED that may be powered include, but are not limited to, sensors (e.g. for detecting electrolyte level, voltage, specific gravity, and temperature), watering valves, data transmitters, and battery management systems.

The probes 20 and 30 may be fabricated from a wide range of suitable electrically conductive, acid-resistant materials. For example, the probes 20 and 30, and especially the negative probe, may be made from lead or carbon. Alternatively, conductive plastics incorporating lead or carbon particles may be used. Lead and carbon currently are preferred because they are inert in acid electrolyte.

"Probe" as used in this application is a broad term referring to a physical object that may be inserted into a battery cell, especially through the vent cap opening but not so limited. "Probe" does not imply a particular shape, geometry, or other physical limitation.

It has been found that a deposit develops around the negative electrode within a short period of time and contributes a back or reverse EMF (electromotive force) of about 2 V (volts). However, after developing, this deposit stabilizes and has no further effect in addition to the back EMF.

Wires 50 may interconnect the probes 20 and 30 with the electrical device ED. "Wire" or "wires" as used in the application is a broad term referring to any electrical connector adapted to or otherwise capable of electrically connecting the probes 20 and 30 and the electrical device ED.

The approach of the present invention is particularly useful and convenient when used in conjunction with a single point watering system (SPWS). In such applications, the probes 20 and 30 can extend through, be integrated into, or otherwise incorporated with the valves; and the circuit wires 50 may be located adjacent to, affixed to, or otherwise supported by the SPWS tubing and/or manifolds. The wires 50 also may be strung through a dual extruded tube. All of these techniques protect the wires 50 from damage. When used in conjunction with an SPWS, the SPWS helps to maintain proper electrolyte levels within the cells, so that the probe remains covered with electrolyte throughout normal variations in electrolyte level.

The probes also can extend through, be integrated into, or otherwise incorporated with the battery cell vent caps 40, for example, if a watering system is not used.

The described system and method simplify the installation and powering of instrumentation and other electrical devices used in conjunction with wet cell batteries. When incorporated into watering systems, the described system and method enable instrumentation and other electrical devices to be contained within the watering system, automatically powering up when the watering system is installed.

The safety issues of the present invention are no different than those of the prior art.

Below is an example of the calculation of the voltage provided when the probes 20 and 30 are inserted into the cells 1 and 5 through the vent caps 40 (as illustrated).

N=Number of cells between and including the probes
$V_B$=Back EMF
$V_C$=Voltage differential between adjacent cells
$V=V_C*(N-1)-V_B$
When N=5, $V_B$=2 volts, and $V_C$=2 volts, then V=2*(5-1)-2=6 volts.

The invention is not limited to the details of operation or to the details of construction and the arrangement of the components set forth in the description or the drawings. The invention may be implemented in various other embodiments and can be practiced or carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

The above description is that of current embodiments of the invention. Various alterations and changes can be made without departing from the spirit and broader aspects of the invention as defined in the appended claims, which are to be interpreted in accordance with the principles of patent law including the doctrine of equivalents.

This disclosure is presented for illustrative purposes and should not be interpreted as an exhaustive description of all embodiments of the invention or to limit the scope of the claims to the specific elements illustrated or described in connection with these embodiments. For example, and without limitation, any individual element of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to elements in the singular, for example, using the articles "a," "an," "the" or "the," is not to be construed as limiting the element to the singular.

The invention claimed is:

1. A wet cell battery assembly comprising:
    a wet cell battery including a plurality of cells each containing electrolyte and each including a vent cap opening;
    a device requiring electrical power;
    a first electrically conductive probe inserted through the vent cap opening and into the electrolyte in a first one of the battery cells and electrically connected to the device; and
    a second electrically conductive probe inserted through the vent cap opening and into the electrolyte in a second one of the battery cells different from the first one of the battery cells and electrically connected to the electrical device.

2. A wet cell battery assembly as defined in claim 1 wherein the first and second probes comprise at least one of lead and carbon.

3. A wet cell battery assembly as defined in claim 1 wherein the first and second probes comprise electrically conductive plastic.

4. A wet cell battery assembly as defined in claim 3 wherein the first and second probes further comprise at least one of lead and carbon particles.

5. A wet cell battery assembly as defined in claim 1 wherein:
    the wet cell battery further includes first and second vent caps associated with the first and second cells respectively;
    the first probe extends through the first vent cap; and
    the second probe extends through the second vent cap.

6. A wet cell battery assembly comprising:
    a wet cell battery including a plurality of cells each containing electrolyte;
    a device requiring electrical power;
    a first electrically conductive probe inserted into the electrolyte in a first one of the battery cells and electrically connected to the device;
    a second electrically conductive probe inserted into the electrolyte in a second one of the battery cells different from the first battery cell and electrically connected to the electrical device;
    a single point watering system including first and second valves associated with the first and second cells respectively;
    the first probe extending through the first valve; and
    the second probe extending through the second valve.

7. A method of providing electrical power to an electrical device used in conjunction with a wet cell battery having multiple cells each containing electrolyte and each including a vent cap opening, the method comprising:
    inserting a first electrically conductive probe through the vent cap opening and into the electrolyte in a first cell of the multiple cells of the wet cell battery;
    inserting a second electrically conductive probe through the vent cap opening and into the electrolyte in a second cell of the multiple cells of the wet cell battery, the second cell being different from the first cell; and
    electrically connecting the first and second probes to the electrical device.

8. A method as defined in claim 7 wherein the first and second probes comprise at least one of lead and carbon.

9. A method as defined in claim 7 wherein the first and second probes comprise electrically conductive plastic.

10. A method as defined in claim 9 wherein the first and second probes further comprise at least one of lead and carbon particles.

11. A method as defined in claim 7 wherein:
the first inserting step includes incorporating the first probe into a first vent cap on the first cell; and
the second inserting step includes incorporating the second probe into a second vent cap on the second cell.

12. A method of providing electrical power to an electrical device used in conjunction with a wet cell battery having multiple cells, the method comprising:
inserting a first electrically conductive probe into the electrolyte in a first cell of the wet cell battery;
inserting a second electrically conductive probe into the electrolyte in a second cell of the wet cell battery, the second cell being different from the first cell;
electrically connecting the first and second probes to the electrical device;
the first inserting step including incorporating the first probe into a first valve of a single point water system; and
the second inserting step including incorporating the second probe into a second valve of the single point watering system.

* * * * *